(12) United States Patent
Hasegawa et al.

(10) Patent No.: US 10,528,271 B2
(45) Date of Patent: Jan. 7, 2020

(54) MANAGING READ/WRITE COMPATIBILITY BETWEEN STORAGE DEVICES AND STORAGE MEDIA

(71) Applicant: International Business Machines Corporation, Armonk, NY (US)

(72) Inventors: Tohru Hasegawa, Tokyo (JP); Hiroshi Itagaki, Yokohama (JP); Shinsuke Mitsuma, Machida (JP); Tsuyoshi Miyamura, Yokohama (JP); Sosuke Matsui, Tokyo (JP); Noriko Yamamoto, Tokyo (JP)

(73) Assignee: International Business Machines Coporation, Armonk, NY (US)

( * ) Notice: Subject to any disclaimer, the term of this patent is extended or adjusted under 35 U.S.C. 154(b) by 15 days.

(21) Appl. No.: 15/939,627

(22) Filed: Mar. 29, 2018

(65) Prior Publication Data

US 2019/0303020 A1    Oct. 3, 2019

(51) Int. Cl.
| | |
|---|---|
| G06F 12/00 | (2006.01) |
| G06F 3/06 | (2006.01) |
| G11B 5/008 | (2006.01) |
| G11B 15/68 | (2006.01) |
| G06F 16/83 | (2019.01) |

(52) U.S. Cl.
CPC .......... *G06F 3/0617* (2013.01); *G06F 3/0659* (2013.01); *G06F 3/0686* (2013.01); *G11B 5/00817* (2013.01); *G11B 15/689* (2013.01); *G06F 16/83* (2019.01)

(58) Field of Classification Search
None
See application file for complete search history.

(56) References Cited

U.S. PATENT DOCUMENTS

| | | | |
|---|---|---|---|
| 7,626,778 B2 | 12/2009 | Evans | |
| 2003/0126460 A1* | 7/2003 | Camble | G11B 5/00813 726/7 |
| 2006/0087759 A1* | 4/2006 | Evans | G11B 20/10 360/48 |
| 2010/0302667 A1 | 12/2010 | Fry et al. | |
| 2015/0293935 A1* | 10/2015 | Abe | G06F 16/178 707/611 |

* cited by examiner

*Primary Examiner* — Daniel D Tsui
(74) *Attorney, Agent, or Firm* — Edward J. Wixted, III

(57) ABSTRACT

A tape library storage system, keeps track of the identity(ies) of the drive unit(s) that write upon the storage medium of each tape cartridge, and associates the drive unit identity information with the data that each drive writes. The system writes the associated identity information in the tape cartridge memory and/or inserts the information in an index and writes the index on the tape. If a read error occurs when attempting to read data from the tape, the system, by reference to the associated identity information, determines the identity of the original tape drive that had written the data, and transfers the cartridge to the original drive to attempt again to read the data.

15 Claims, 9 Drawing Sheets

```xml
<file>
<name>FileA</name>                                          ⌐406
<length>1048576</length>
<readOnly>false</readOnly>
<creationTime>2012-10-10T01:20:27.000818000Z</creationTime>
<changeTime>2012-12-10T00:25:33.000367000Z</changeTime>
<modifyTime>2012-12-10T00:25:33.000367000Z</modifyTime>
<accessTime>2012-12-10T00:25:33.000364000Z</accessTime>
<backupTime>2012-10-10T01:20:27.000818000Z</backupTime>
<fileUID>1014</fileUID>
<extentInfo>
 <extent>
  <fileOffset>0</fileOffset>
  <partition>b</partition>
  <startBlock>1036</startBlock>
  <byteOffset>0</byteOffset>
  <byteCount>1048576</byteCount>
  <driveInfo>
   <manufacturerID>ABC</manufacturerID>         ⌐408
   <serialNumber>000123</serialNumber>          ⌐409
  </driveInfo>
 </extent>
</extentInfo>
</file>
```

FIG. 4A

```
440  ┌ 442 ┌ <?xml version="1.0" encoding="UTF-8"?>
     │     │ <ltfsindex version="2.0.0">
     │     │ <creator>IBM LTFS 1.2.0 - Linux - ltfs</creator>
     │     │ <volumeUUID>
     │     │ 30a91a08-daae-48d1-ae75-69804e61d2ea
     │     │ </volumeUUID>
     │     └ <generationNumber>3</generationNumber>
     │       ...
     │ 444 ┌ <previousGenerationLocation>
     │     │ <partition>b</partition>
     │     │ <startBlock>20</startBlock>
     │     └ </previousGenerationLocation>
     │ 446 ┌ <previousDriveInfo>
     │     │ <manufacturerID>XYZ</manufacturerID>
     │     │ <serialNumber>000456</serialNumber>
     │     └ </previousDriveInfo>
     └       ...
```

FIG. 4C

MANAGING READ/WRITE COMPATIBILITY BETWEEN STORAGE DEVICES AND STORAGE MEDIA

BACKGROUND

The present invention relates generally to the field of computer storage and more particularly to the field of mass storage library systems.

A tape storage library system is a mass data storage system in which sometimes hundreds or thousands of tape cartridges are held in an array called a library. Each cartridge includes a storage medium (a magnetic tape), and cartridge memory (a non-volatile memory device for storing metadata pertaining to information stored on the tape). The library may be serviced by multiple tape drive units. Under direction of a controller, an accessor (transport mechanism) retrieves a tape cartridge from rest (a storage slot in the library) and delivers it to an available tape drive unit. The drive-unit mounts the cartridge, performs read and/or write operations as directed, and un-mounts the cartridge, whereupon the accessor returns it to a storage slot. A cartridge may cycle from rest, to a drive, and back again any number of times. Each time a cartridge goes through a mount/un-mount cycle, it may go to an arbitrary drive. Various blocks of data written on the tape may be written by different drives and may be read-out by different drives.

SUMMARY

According to an aspect of the present invention, there is a method, computer program product and/or system that performs the following operations (not necessarily in the following order): (i) receiving, by a storage system and from a first application, an application dataset; (ii) loading, by the storage system, and into a first drive unit, a storage device comprising a storage medium and a non-volatile memory device; (iii) writing, by the first drive unit, and at a first location on the storage medium, the application dataset; (iv) reading, from the first drive unit, a first identity dataset; (v) associating the first identity dataset with the application dataset to produce an associated identity dataset; (vi) writing, by the first drive unit, at a second location on the storage medium, and further in the non-volatile memory device, the associated identity dataset; (vii) attempting to read, by a second drive unit, the application dataset from the storage medium; (viii) receiving, from the second drive unit, information indicating that the attempt to read the application dataset failed; (ix) reading, from the storage medium, the associated identity dataset; (x) locating the first drive unit based, at least in part, on the associated identity dataset; (xi) mounting the storage device in the first drive unit; and (xii) reading, by the first drive unit, the application dataset

BRIEF DESCRIPTION OF THE DRAWINGS

FIG. 4A is a screenshot showing at least a portion of extensible markup language (XML) in an index file, in accordance with at least one embodiment of the present invention;

FIG. 4C is a screenshot showing at least a portion of XML in an index file, in accordance with at least one embodiment of the present invention;

DETAILED DESCRIPTION

Figure 1A:
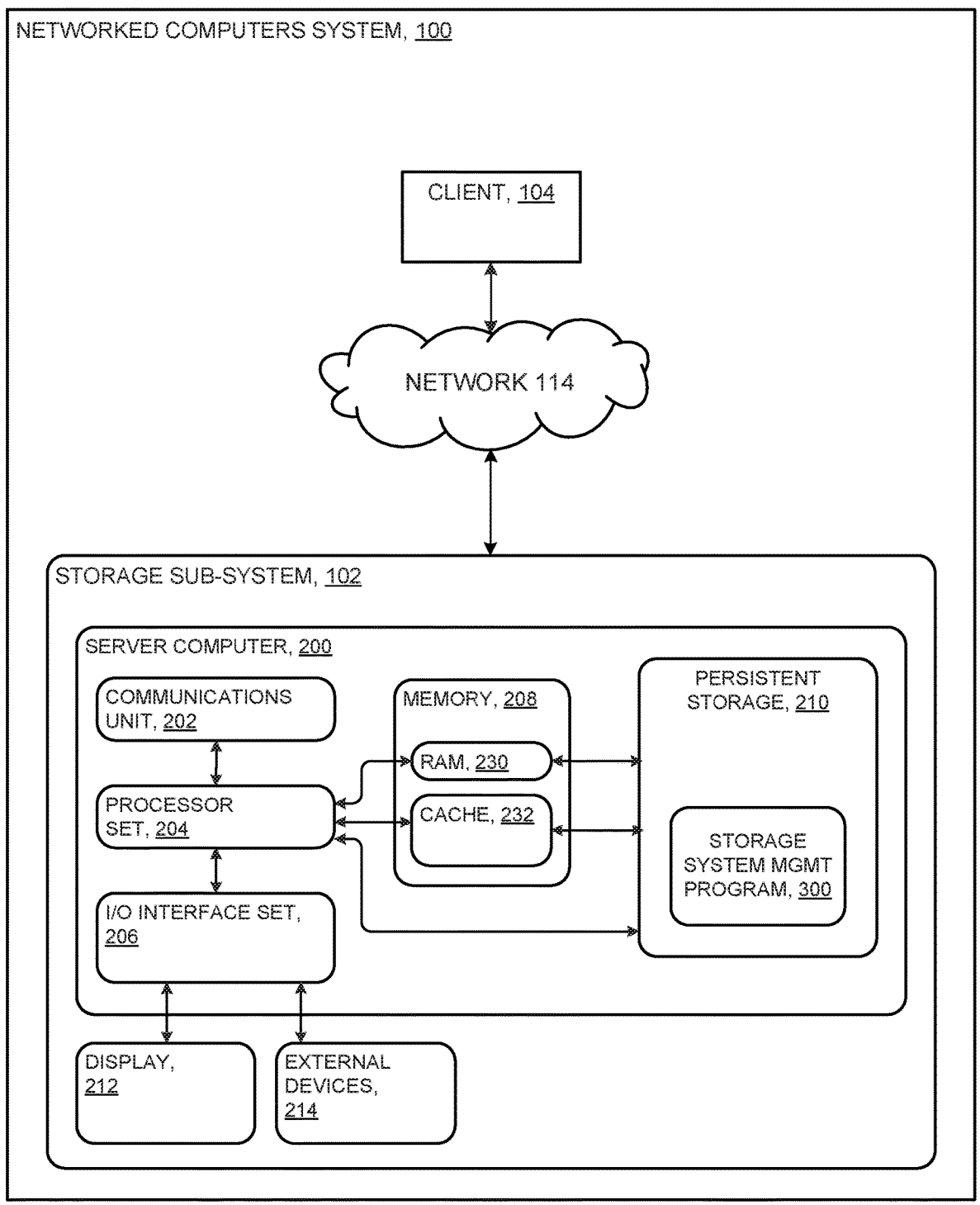
FIG. 1A is a functional block diagram showing a computing environment in accordance with at least one embodiment of the present invention.

Some embodiments of the present invention extend the functionality of a linear tape file system (LTFS), to address compatibility issues that may exist among different tape drives. For example, in some embodiments, a first tape drive (sometimes herein referred to as an original tape drive) writes a file to a tape cartridge. The original drive records in an index on the tape, and in cartridge memory, information that uniquely identifies the original tape drive and associates that identity information with the data blocks, extents, files, etc. that were written by the original drive. If a subsequent attempt to read the data by a second tape drive (sometimes herein referred to as a current tape drive) fails (generates a read error), the system identifies the original tape drive based on the associated identity information recorded in the index and/or in cartridge memory. Then, based on the tape drive identity information, the original tape drive is located and the tape cartridge is automatically transferred to and mounted in the original tape drive, thereby increasing the likelihood that the file can be read without error.

This Detailed Description section is divided into the following sub-sections: (i) The Hardware and Software Environment; (ii) Example Embodiment; (iii) Further Comments and/or Embodiments; and (iv) Definitions.

I. THE HARDWARE AND SOFTWARE ENVIRONMENT

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An embodiment of a possible hardware and software environment for software and/or methods according to the present invention will now be described in detail with reference to the Figures. FIG. 1A is a functional block diagram illustrating various portions of networked computers system 100, including: storage sub-system 102; client computer 104; communication network 114; server computer 200; communications unit 202; processor set 204; input/output (I/O) interface set 206; memory device 208; persistent storage device 210; display device 212; external device set 214; random access memory (RAM) devices 230; cache memory device 232; and storage system management program 300.

Storage sub-system 102 is, in many respects, representative of the various computer sub-system(s) in the present invention. Accordingly, several portions of storage sub-system 102 will now be discussed in the following paragraphs.

Storage sub-system 102 may be a laptop computer, tablet computer, netbook computer, personal computer (PC), a desktop computer, a personal digital assistant (PDA), a smart phone, or any programmable electronic device capable of communicating with the client sub-systems via communications network 114. Storage system management program 300 is a collection of machine readable instructions and/or data that is used to create, manage and control certain software functions that will be discussed in detail, below, in the Example Embodiment sub-section of this Detailed Description section.

Storage sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Storage sub-system 102 is shown as a block diagram with many double arrows. These double arrows (no separate reference numerals) represent a communications fabric, which provides communications between various components of storage sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for storage sub-system 102; and/or (ii) devices external to storage sub-system 102 may be able to provide memory for storage sub-system 102.

Storage system management program 300 is stored in persistent storage 210 for access and/or execution by one or more of the respective computer processor set 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Storage system management program 300 may include both machine readable and performable instructions and/or substantive data (that is, the type of data stored in a database). In this embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to storage sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, storage system management program 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 1B:
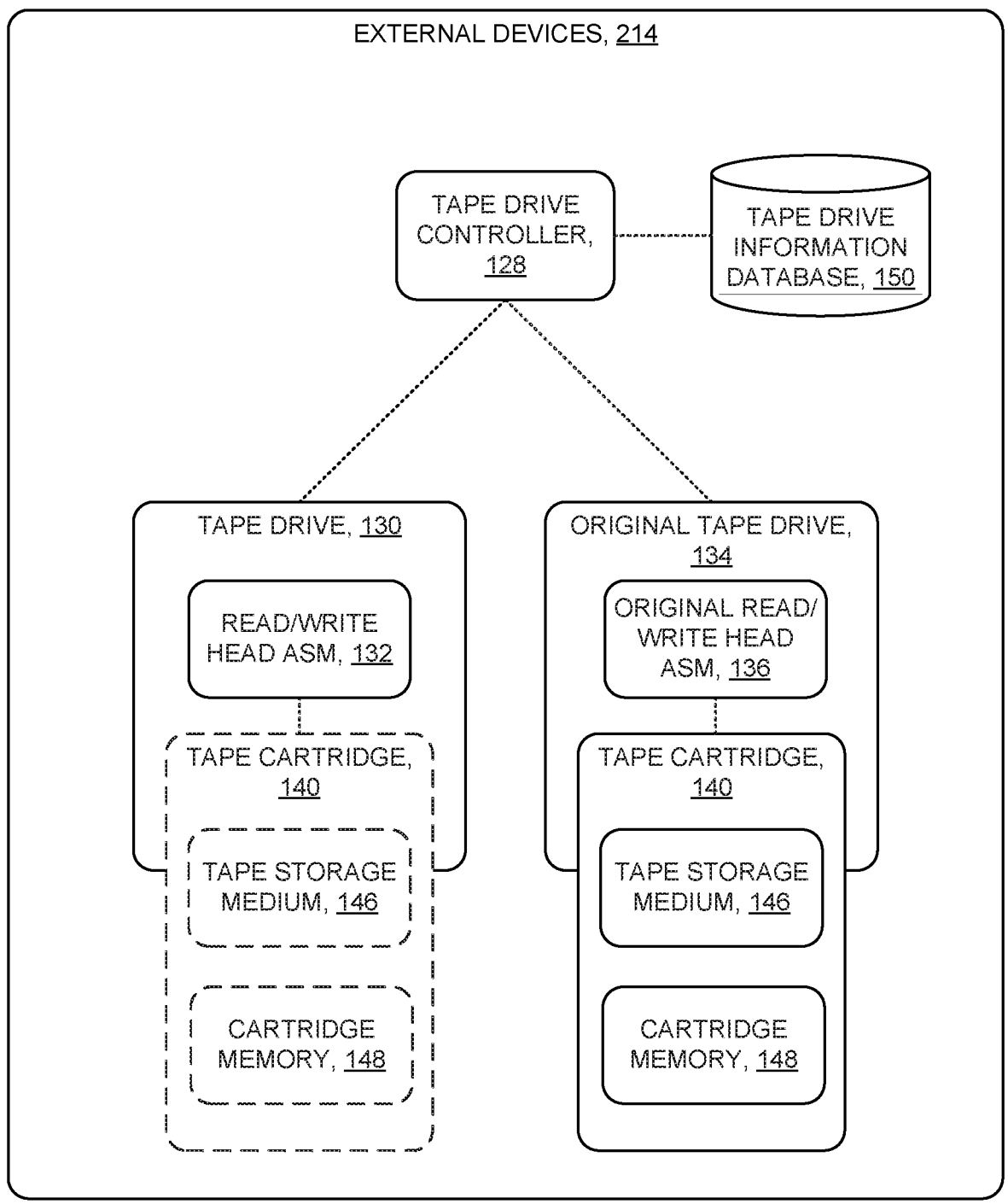
FIG. 1B is a functional block diagram showing at least some components of external devices, in accordance with at least one embodiment of the present invention.

FIG. 1B shows some components of external devices 214 (see FIG. 1A), including: tape drive controller 128; tape drive 130; read/write head assembly 132; original tape drive 134; original read/write head assembly 136; tape cartridge 140; tape storage medium 146; and cartridge memory 148. Unless specified otherwise, tape drive 130 is treated herein as a "current tape drive" and original tape drive 134 is treated as a tape drive that had previously written on tape storage medium 146 an extent, a file, an index, and/or other data. The distinction between "current tape drive" and "original tape drive", as these terms are used herein, is explained in greater detail below, with respect to FIGS. 6 and 7, in subsection "Further Comments and/or Embodiments" of this Detailed Description section. In some embodiments, cartridge memory 148 is a non-volatile memory chip affixed to a tape cartridge (or other storage device).

II. EXAMPLE EMBODIMENT

Figure 2:
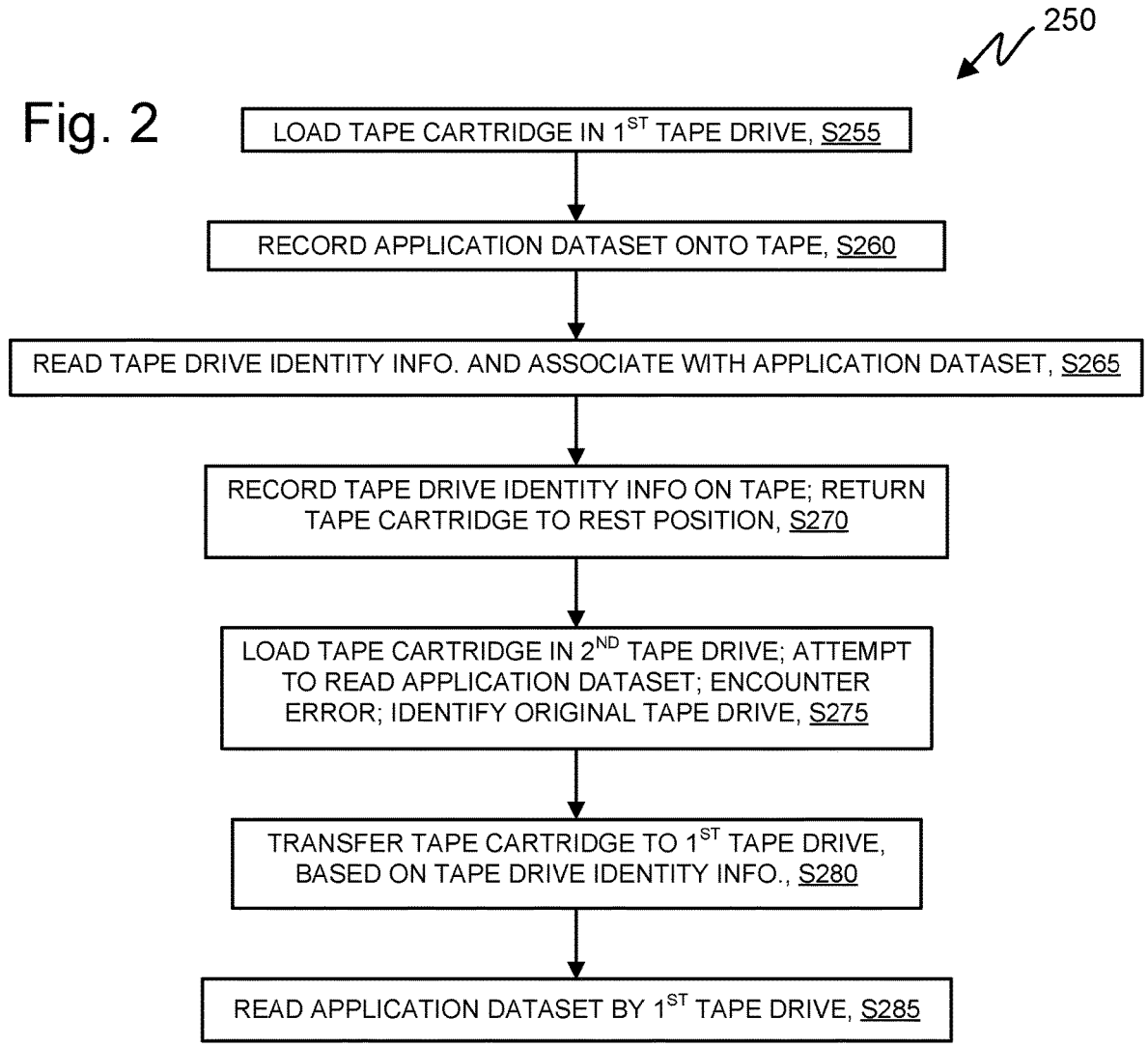
FIG. 2 is a flowchart showing a method performed, at least in part, in accordance with at least one embodiment of the present invention.
Figure 3:
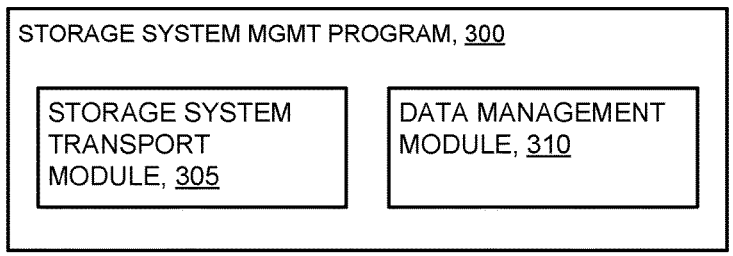
FIG. 3 is a block diagram showing a machine logic (for example, software) portion of a system in accordance with at least one embodiment of the present invention.

FIG. 2 shows flowchart 250 depicting a method according to the present invention. FIG. 3 shows storage system management program 300 for performing at least some of the method operations of flowchart 250. This method and associated software will now be discussed, over the course of the following paragraphs, with extensive reference to FIG. 2 (for the method operation blocks) and FIG. 3 (for the software blocks).

Processing begins at operation S255, where storage system transport module 305, of storage system management program 300, retrieves tape cartridge 140 from a rest position and transports it to original tape drive 134 (see FIG. 1B). Original tape drive 134 mounts tape cartridge 140, sometimes referred to as loading the tape cartridge into the tape drive. Original tape drive 134 is one of at least two, and sometimes many, tape drives in a tape library system. Generally, when needed, a tape cartridge can be loaded into any one of the (sometimes many) available tape drives in a system. A tape may eventually have data written on it by many different tape drives. Some embodiments of the present invention maintain information on the tape medium that associates each portion of data with the drive unit that wrote the portion of data.

Processing proceeds at operation S260, where data management module 310, of storage system management program 300, records a data unit (the data unit can be any unit of data—for instance, in a linear tape file system, library edition (LTFS LE), a data unit may be referred to as a record) onto tape storage medium 146 of tape cartridge 140, via original read/write head assembly 136. In some embodiments, a data unit is subset of application data superset, for example, part of (the subset) an entire database table (the superset).

Note that in a storage library system, various components may be in data communication between and among them. For example, tape drive 130, read/write head assembly 132 (FIG. 1B), storage system transport module 305, data management module 310, storage system management program 300, etc., may be in data communication with one another, in one form or another, at various times. See definition of data communication below in the Definitions subsection of this Detailed Description section.

Processing proceeds at operation S265, where data management module 310, through communication with original tape drive 134, determines information that can be used to uniquely identify original tape drive 134. Data management module 310 associates the tape drive identity information (sometimes herein referred to as the drive identity dataset) with the data unit recorded in operation S260 above, to generate associated drive identity information. In some embodiments, all data recorded on tape storage medium 146, down to a granularity level of the smallest addressable unit, is associated with identity information of the respectively corresponding tape drive that had written the data. If any portion of data is updated after having initially been written, the identity information is updated to include information associated with the tape drive that most recently performed any write operations on the same area of the tape. In some embodiments, the identity information includes information associated with every tape drive that performed write operations on the corresponding area of the tape.

In some embodiments, new data is written to tape by appending the new data following the most recently written existing data. Some areas of a tape may be overwritten. In some embodiments, such as an LTFS embodiment, a user may create (write) a file and the user may modify (overwrite) the file. In the case of modifying a file, the modified data is appended following the most recently written data on the tape, and the old data for the file remains on the tape but is no longer referenced by LTFS.

Processing proceeds at operation S270, where data management module 310 records the associated drive identity information generated in operation S265 above, onto tape storage medium 146, through original read/write head assembly 136 of original tape drive 134 and also onto cartridge memory 148 affixed to tape cartridge 140. In some embodiments, data management module 310 records the associated drive identity information in an index partition, or elsewhere, on the tape. Once write operations are completed, storage system transport module 305 returns tape cartridge 140 to rest position (a physical storage location within the storage library system, not shown in the Figures).

Processing proceeds at operation S275, where data management module receives, from a requester, a request to read the user dataset, recorded in operation S260 above, from tape cartridge 140. Storage system transport module 305, retrieves tape cartridge 140 from rest position and transports it to tape drive 130 (see FIG. 1B). Tape drive 130 attempts to read the user dataset, encounters a read error, and reports the read error to data management module 310. In response to receiving the read error report, data management module 310 retrieves the associated identity information from cartridge memory 148. Alternatively, in some embodiments, data management module 310 directs tape drive 130 to read an index from the tape drive, and more particularly, to read the associated identity information therefrom, passing the information back to data management module 310.

Processing proceeds at operation S280, where data management module determines the location and availability of original tape drive 134. After determining that original tape drive 134 is available, storage system transport module 305 transfers tape cartridge 140 from tape drive 130 to original tape drive 134.

Processing proceeds at operation S285, where original tape drive 134 proceeds to read the user dataset from tape storage medium 146, and sends the user dataset to data management module 310, which relays the dataset to the requester.

As will be discussed below with respect to FIGS. 4A and 4C in the Further Comments and/or Embodiments subsection of this Detailed Description section, tape drive identity information may include a manufacturer's identifier and a serial number of the tape drive. In some embodiments, tape drive identity information may include other information instead of, or in addition to, tape drive manufacturer and serial number. For example, the information may include traceability data pertaining to certain tape drive components such as read/write heads, servo motors, bearings, electronic components, microcode or firmware version, etc. This traceability information may enable more selective options when a library system attempts to recover from a read error.

For example, consider a current tape drive that encounters read errors when it tries to read a file that was written by the original tape drive that was built by manufacturer "ABC", in production lot A100. The library system may first seek out the original tape drive to attempt to read the file. In some embodiments of the present invention, the system seeks out a tape drive having a read/write head built by "ABC" on production lot A100, and on finding such a tape drive, mounts the tape in that drive to attempt the read, thereby perhaps increasing the probability that the file can be read without errors.

In some embodiments, the library system collects and maintains records of read errors, including all information pertaining to the drives on which those errors occur, and results of swapping drives in response to the errors. Over time, a database of such data will accumulate, which can then be mined for insights as to which drives, and/or which internal components of the drives provide better or worse service. In some embodiments, this data is fed back to the tape drive manufacturers to aid them in improving the drives. The data is further used to inform future purchasing decisions as to which tape drives (build dates, manufacturing lots, or from which manufacturers) should be purchased or avoided. Further, through cognitive analysis of the accumulated read error data and results of error recovery attempts, analysis may flag particular tape cartridges that exhibit an excessive rate of read errors, indicating deterioration of the tape medium (and/or information stored thereon). In such a scenario, the tape library system may determine, autonomously or with human intervention, that data on the tape should be transferred to a new tape, or to another type of storage medium to prolong the useful life of the data.

III. FURTHER COMMENTS AND/OR EMBODIMENTS

Some embodiments of the present invention may recognize the following facts, potential problems, and/or potential areas for improvement with respect to the current state of the art: (i) a file that is written by an original tape drive may be unreadable by a different tape drive, due to various factors that include: (a) manufacturing variations inherent in the drives, (b) deterioration over time of the tape medium, and information recorded thereon; and/or (c) degradation and wear of certain components of the tape drive over time; (ii) conventional systems do not track the identity of the original tape drive; and (iii) conventional systems do not correlate data written with the drive that wrote the data.

Some embodiments of the present invention provide (through software, hardware, firmware, or any combination thereof), an extension to a mass storage library system. Examples of mass storage library systems that may exist, or may be developed in the future, include a linear tape file system, library edition (LTFS LE), optical disk (for example an optical jukebox), optical cube, solid state drive, flash drive, to name just a few of many possible examples. It is to be understood that references to an LTFS system, or LTFS LE system, as used herein, may similarly be applied to any other mass storage library system, such as the examples mentioned above. Moreover, mentions of a tape drive are to be understood to apply similarly to other types of drive which are employed by any other type of mass storage library system. For example, references to a tape drive unit may be equally applicable to an optical drive unit.

In some embodiments of the present invention, drive-specific information which uniquely identifies a tape drive (tape drive ID) includes a manufacturer's name, and a serial number assigned to the tape drive. In some embodiments, this information is encoded in non-volatile storage built into the tape drive (sometimes referred to as cartridge memory). In some embodiments, this information is hard-wired in circuitry (not shown in the Figures) of the tape drive.

A conventional LTFS stores one or more indexes on a tape to help keep track of data files stored on the tape. In some embodiments of the present invention, an index comprises code that conforms to a set of extensible markup language (XML) standards and specifications. An index includes information (metadata) such as file names, file lengths, and timestamps associated with creation, modification, and accesses with respect to (at least some) files written on the tape.

Index file-segment 400, of FIG. 4A, is expressed as XML code and is part of a fictitious index, written to tape, for illustrative purposes. In some embodiments of the present invention, an index is written in machine-readable languages other than XML, some human-readable (such as XML, comma separated values (CSV), etc.) and some not human-readable (such as a strictly binary code that has no human-readable representation). Index file-segment 400 includes the code between the XML tags <file> and </file>, inclusive. Nested within index file-segment 400 is extent-information 401. Nested within extent-information 401 are one or more instances of extent 402 (the code between tags <extent> and </extent>, inclusive). In index file-segment 400, shows only one instance of extent 402. Nested within each instance of extent 402 is drive-info 404. One skilled in the relevant arts will recognize that in the nesting structure, an interior structure is associated with the containing wrapper. For example, drive-info 404 is associated with extent 402, which in turn is associated with extent-information 401, which itself is associated with FileA.

Index file-segment 400 pertains to a file named "FileA" (line 406). Index file-segment 400 includes extent-information 401. Some embodiments of the present invention insert drive-info 404, within extent 402, to indicate that drive-info 404 is associated specifically with extent 402. Drive-info 404 uniquely identifies the tape drive that wrote FileA on the tape, that is manufacturer ABC (line 408), and tape drive unit serial number 000123 (line 409). The association between the tape drive (identified in lines 408 and 409) and FileA is made because drive-info 404 is nested within index file-segment 400.

In some embodiments of the present invention, a tape drive is identified by a unique tape drive identifier which can be referenced back to tape drive information database 150 (see FIG. 1B). Tape drive information database 150 includes information to identify the rack, rack location, manufacturer, serial number and other information specific to the tape drive. The tape drive inserts its unique identifying within drive-info 404. Tape drive controller 128 (see FIG. 1B) can retrieve any available information, pertaining to any tape drive represented in tape drive information database 150, including the information pertaining to the tape drive identified by the unique tape drive identifier recorded in drive-info 404.

In some embodiments of the present invention, the tape drive writes drive-info 404 in other areas of an index, not necessarily in extent 402 and not necessarily in index file-segment 400. For example, consider a writing session in which the tape drive writes series of extents. The tape drive writes a respectively corresponding series of instances of extent 402, within extent-information 401. Instead of repeating drive-info 404 in each instance of extent 402, the tape drive writes one instance of drive-info 404 in extent-information 401 but outside any of the instances of extent 402. In some embodiments, the tape drive writes drive-info 404 in a customized data structure separate and distinct from an index.

Notwithstanding the location where, and in what form, drive-info 404 is written, a tape drive writes drive-info 404 in such a way as to associate the corresponding tape drive with the files, data blocks, and/or extents, which have been written by the tape drive.

Some embodiments of the present invention define tags <extent>, <driveinfo>, <manufacturerid>, <serialnumber>, and other tags, in a data type definition (DTD) file, an XML schema file, a "REgular LAnguage for XML Next Generation" (RELAX NG) file, or the like.

Storage of the tape drive specific information for each extent allows a tape drive (for example, tape drive 130, see FIG. 1B) to be identified in units of data writing (such as units of block, extent, file, or any other identifiable data unit) because the tape drive specific information is stored in association with each extent (or other data unit), even in a case where an update is performed using another tape drive after a file is initially written. In other words, for example, a file may be distributed across several extents, placed anywhere on the tape, and the file or parts thereof may be written and/or modified by multiple tape drives. Therefore, the index preserves information that associates every part of a file with the drive that wrote it. Tape drive controller 128 (see FIG. 1B) can identify the corresponding tape drive, by reference either to the corresponding instance of drive-info 404, by further reference to tape drive information database 150 (see FIG. 1B), by reference to cartridge memory, and/or by reference to a customized data structure.

Tape drive 130 (see FIG. 1B) directly adds tape drive specific information to each instance of extent 402 that have been written by tape drive 130. In some embodiments of the present invention, to help mitigate growth in the size of each successive index, tape drive 130 performs a compression function with respect to the indexes. Some embodiments mitigate growth in index size by writing a single instance of drive-info 404, including a unique tape drive identifier, at one place in the index, for example within extent-information 401 (but outside any instance of extent 402), and then each instance of extent 402 specifies the unique tape drive identifier which can then be referenced back to the extent-information in the one place.

Figure 4B:
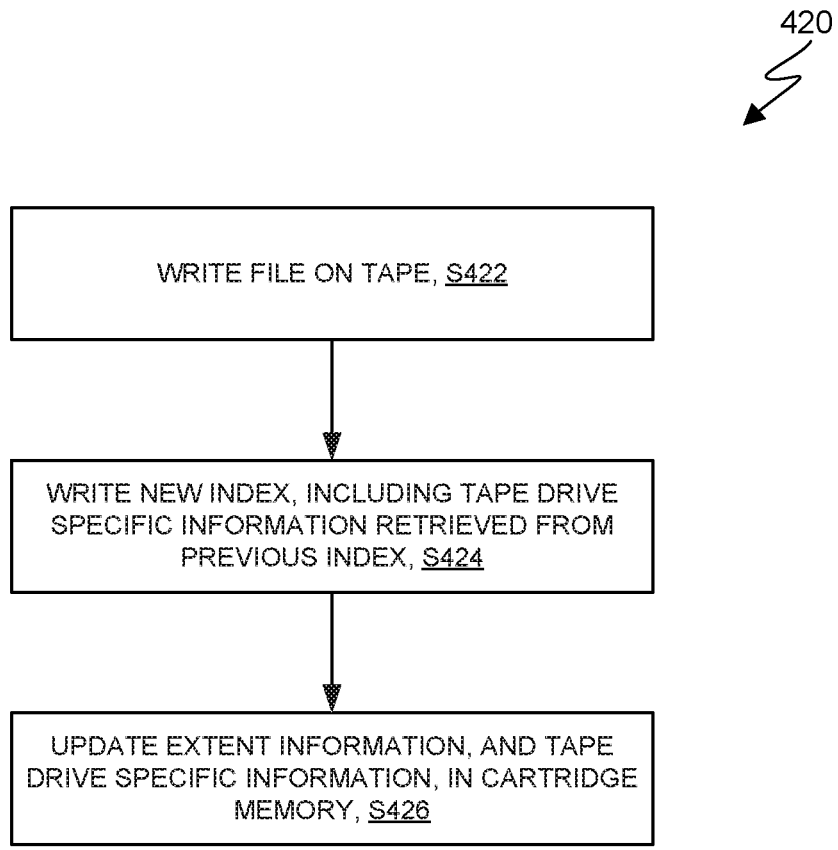
FIG. 4B is a flowchart showing a method performed, at least in part, in accordance with at least one embodiment of the present invention.

Flowchart 420 of FIG. 4B shows a method of writing data on a tape in accordance with some embodiments of the present invention. Processing begins at operation S422, where tape drive 130 writes a file (for example FileA, see FIG. 4A) on tape storage medium 146, of tape cartridge 140 (see FIG. 1B).

Processing proceeds at operation S424, where tape drive 130 writes a new index on the tape. Tape drive 130 (see FIG. 1B) includes in the new index, and drive specific information retrieved from a previously written index. Tape drive 130 further includes, within the new index, tape drive specific information pertaining to itself (tape drive 130, the current tape drive). By this method, in accordance with some embodiments, each successive new index includes: (i) the combined drive specific information included in all prior indexes, along with the respectively corresponding file and/or extent associations; and (ii) the current drive specific information and corresponding file and/or extent associations.

Processing proceeds at operation S426, where tape drive 130 updates extent information, and tape drive specific information pertaining to tape drive 130, in cartridge memory 148 of tape cartridge 140 (see FIG. 1B).

Index header-segment 440, of FIG. 4C, is part of a fictitious example index (a current generation index), expressed in XML, in accordance with some embodiments of the present invention. Index header-segment 440 and index file-segment 400 (FIG. 4A) may be parts of the same index (not shown in its entirety in the Figures). Index header-segment 440 includes: header information 442; previous generation location 444; and previous drive information 446. Previous generation location 444 records the position, on the tape, of a previously written index (not shown in the Figures). Previous drive information 446 records tape drive specific information of the tape drive that wrote the previous generation index.

Figure 5:
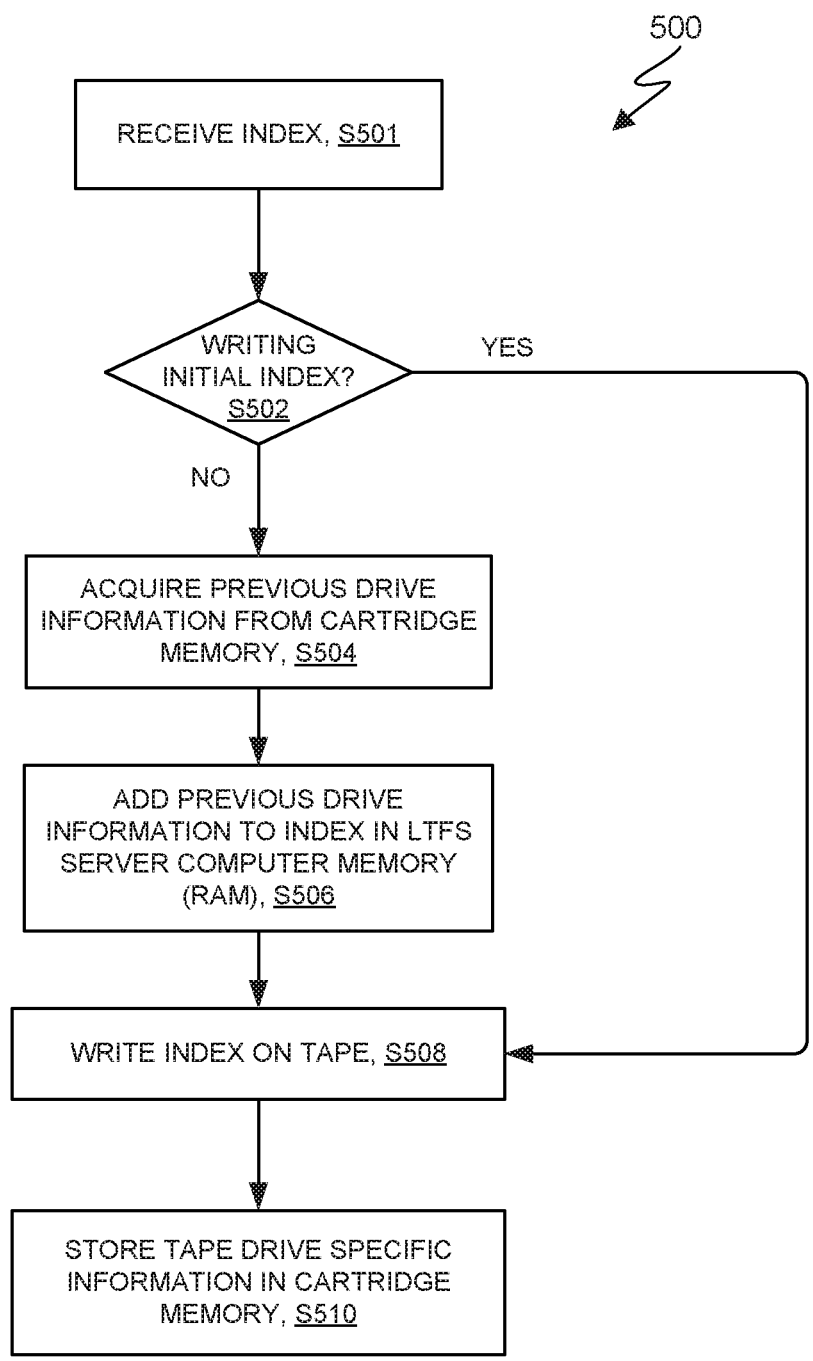
FIG. 5 is a flowchart showing a method performed, at least in part, in accordance with at least one embodiment of the present invention.

Index writing flowchart 500 of FIG. 5 shows a method for writing an index to a tape in accordance with some embodiments of the present invention. Processing begins at operation S501 where tape drive 130 receives, from an LTFS system, a current index to be written on tape storage medium 146 of tape cartridge 140, currently mounted in tape drive 130 (see FIG. 1B).

In some embodiments an LTFS causes an index to be written to a tape under circumstances including (but not limited to) the following circumstances: (i) when a tape cartridge is to be unmounted from a tape drive; (ii) when a user calls an application programming interface (API) (for example FlushFileBuffers( ); (iii) when a user writes a special extended attribute to initiate writing of an index; (iv) in association with closing of a file; and/or (v) after a predefined time interval has elapsed.

Processing proceeds at decision S502. If no other index has previously been recorded on tape storage medium 146 (see FIG. 1B), meaning the current index is to be the first index written thereon, (decision S502, "Yes" branch), processing proceeds at operation S508, where read/write head assembly 132, of tape drive 130, writes the current index onto tape storage medium 146 (see FIG. 1B).

Processing proceeds at operation S510, where tape drive 130 stores information specific to itself, in cartridge memory 148 of tape cartridge 140 (see FIG. 1B).

Returning to decision S502, if one or more indexes have previously been recorded on tape storage medium 146 (see FIG. 1B), meaning the current index is not to be the first index written (decision S502, "No" branch), processing proceeds at operation S504, where tape drive 130 acquires previous drive information 446 (see FIG. 4C) from cartridge memory 148 (see FIG. 1B). In this case, previous drive information includes manufacturer ID "XYZ" and serial number "000456" (see FIG. 4C).

Processing proceeds at operation S506, where tape drive 130 writes the previous drive information (acquired in operation S504 above), to operating system memory of the server computer where LTFS is running (for example, RAM 230, of memory 208, of server computer 200, of storage sub-system 102 (see FIG. 1A).

Processing proceeds at operation S510, where tape drive 130 stores information specific to tape drive 130, in cartridge memory 148 of tape cartridge 140 (see FIG. 1B).

Persons of skill in the relevant art will recognize that each successive index written on the tape, in accordance with some embodiments of the present invention, contains information to identify the current tape drive, plus a cumulative record of information identifying all tape drives having previously been involved in writing to the tape.

Figure 6:
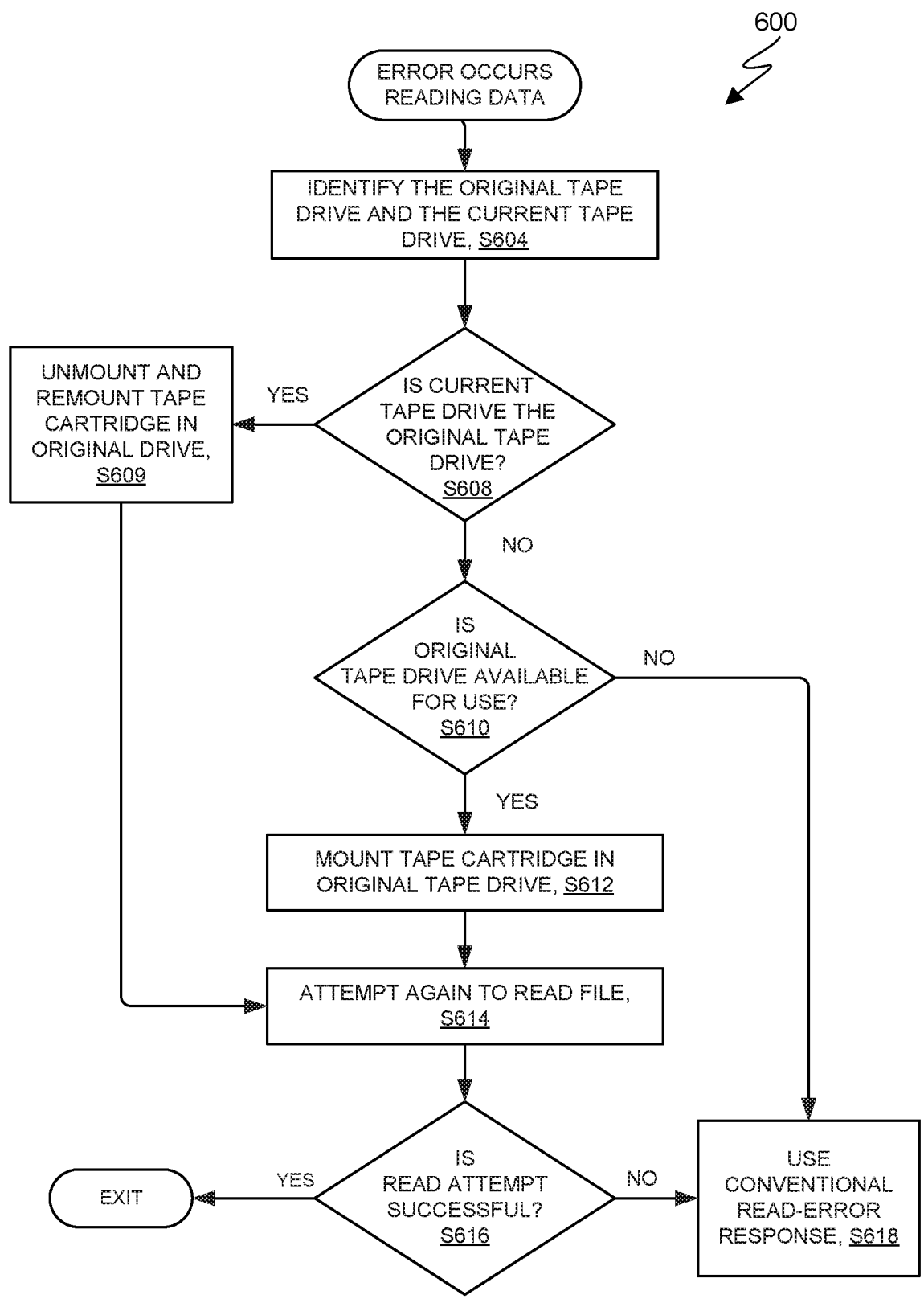
FIG. 6 is a flowchart showing a method performed, at least in part, in accordance with at least one embodiment of the present invention.

Read error flowchart 600 of FIG. 6 shows a method in accordance with some embodiments of the present invention, for responding to a read error generated in response to a request to read target data (for example, a file, an extent, or the like) from a current tape cartridge that is mounted in a current tape drive. Terms as used in this discussion with respect to read error flowchart 600 are defined as follows: (i) "current tape drive" refers to a tape drive in which the tape holding the target data is mounted (for example, tape storage medium 146, of tape cartridge 140, mounted in tape drive 130, see FIG. 1B), for reading the target data, and which experiences the read error; (ii) "original tape drive" refers to the tape drive (which may be one of many drives having written data to the tape, for example, original tape drive 134, see FIG. 1B) that wrote the target data (it is possible that the original tape drive and the current tape drive are the same unit); (iii) "current tape cartridge" refers to the tape cartridge on which the target data resides; (iv) "other tape cartridge" or "another tape cartridge" refers to any tape cartridge other than the current tape cartridge.

Processing begins at operation S604, where after having encountered a read error, a tape drive controller (for example, tape drive controller 128, see FIG. 1B) acquires, from an index read from the current tape cartridge (or from server memory), information to identify the original tape drive. The tape drive controller further acquires drive specific information associated with the current tape drive. In some embodiments, the tape drive controller commands the current tape drive to read out an index from the tape that is associated with the target data, to acquire the drive specific information that identifies the original tape drive. In some embodiments, drive specific information (corresponding to the original tape drive) in the cartridge memory and/or an index on the tape, points to one or more records in a tape drive information database (for example tape drive information database 150, see FIG. 1B), where the original tape drive information is available for retrieval.

Processing proceeds at decision S608, where the tape drive controller compares the original and current drive specific information to determine whether the current tape drive is the same unit as the original tape drive. If the current and original tape drives are the same unit (decision S608, "Yes" branch), processing proceeds at operation S609, where tape drive controller un-mounts and re-mounts (back into the current tape drive) the tape cartridge, whereupon processing proceeds to operation S614 where the tape drive again attempts to read the target data.

Processing proceeds at decision S616. If the attempt to read the target file is again unsuccessful (decision S616, "No" branch), processing proceeds to operation S618, where the system carries out conventional read-error response procedures, whether automated, performed with human intervention, or any combination thereof.

Retuning to decision S608, if the current tape drive is the not the same unit as the original tape drive (decision S608, "No" branch), processing proceeds to decision S610, where the tape drive controller determines whether the original tape drive is available for use. If the original tape drive is available for use (decision S610, "Yes" branch), processing proceeds at operation S612, where the tape drive controller un-mounts the tape cartridge from the current tape drive and mounts the tape cartridge into the original tape drive.

Processing proceeds at operation S614 and continues thereafter in the same manner as discussed above with respect to operations S614, and S616.

Returning to decision S610, if the original tape drive is not available for use (decision S610, "No" branch), processing proceeds at operation S618 where conventional read-error response procedures may be carried out.

There are at least two cases where the original tape drive may not be available for use: In a first case, the original tape drive is busy processing another tape cartridge. In a second case, the original tape drive is no longer in service. With respect to the first case, it may come to pass that the original tape drive had been transferred (either physically, or by software) to another separate and distinct tape library system. In some embodiments, the tape cartridge may be un-mounted from the current drive, transferred to the other tape library system, and mounted there in the original tape dive. With respect to the second case, the original tape drive may have been removed from service; it may be present in the library system but non-functional (for example jammed, defective, scheduled for replacement, etc.), or it may be present but reserved to perform a service request with a priority higher than a priority assigned to the current tape cartridge read-request. The tape drive controller may determine, based on various configuration settings and/or user input, whether to wait for the original drive to become available, whether to transfer the cartridge to another tape library system, or to deem the original drive unavailable with respect to the request to read the target data.

In some embodiments of the present invention, if a read error is encountered when trying to read some target data, tape drive specific information of the original tape drive (the drive that wrote the target data) is recorded in an LTFS log file such that, by referencing the log file, a user or automated system can then identify the original drive and subsequently mount the tape cartridge into the original drive.

In some embodiments of the present invention, a tape library system maintains a catalog database in which each file and/or extent that is written, throughout all the tapes in the library system, is associated with a respectively corresponding tape drive that wrote the file and/or extent. When the system receives a request to read targeted data from a tape cartridge, the system, with reference to the catalog database, matches up the tape cartridge with the tape drive that wrote the targeted data. In such an embodiment, the probability of encountering a read error, and the overhead associated with error recovery attempts, may be reduced.

Figure 7:
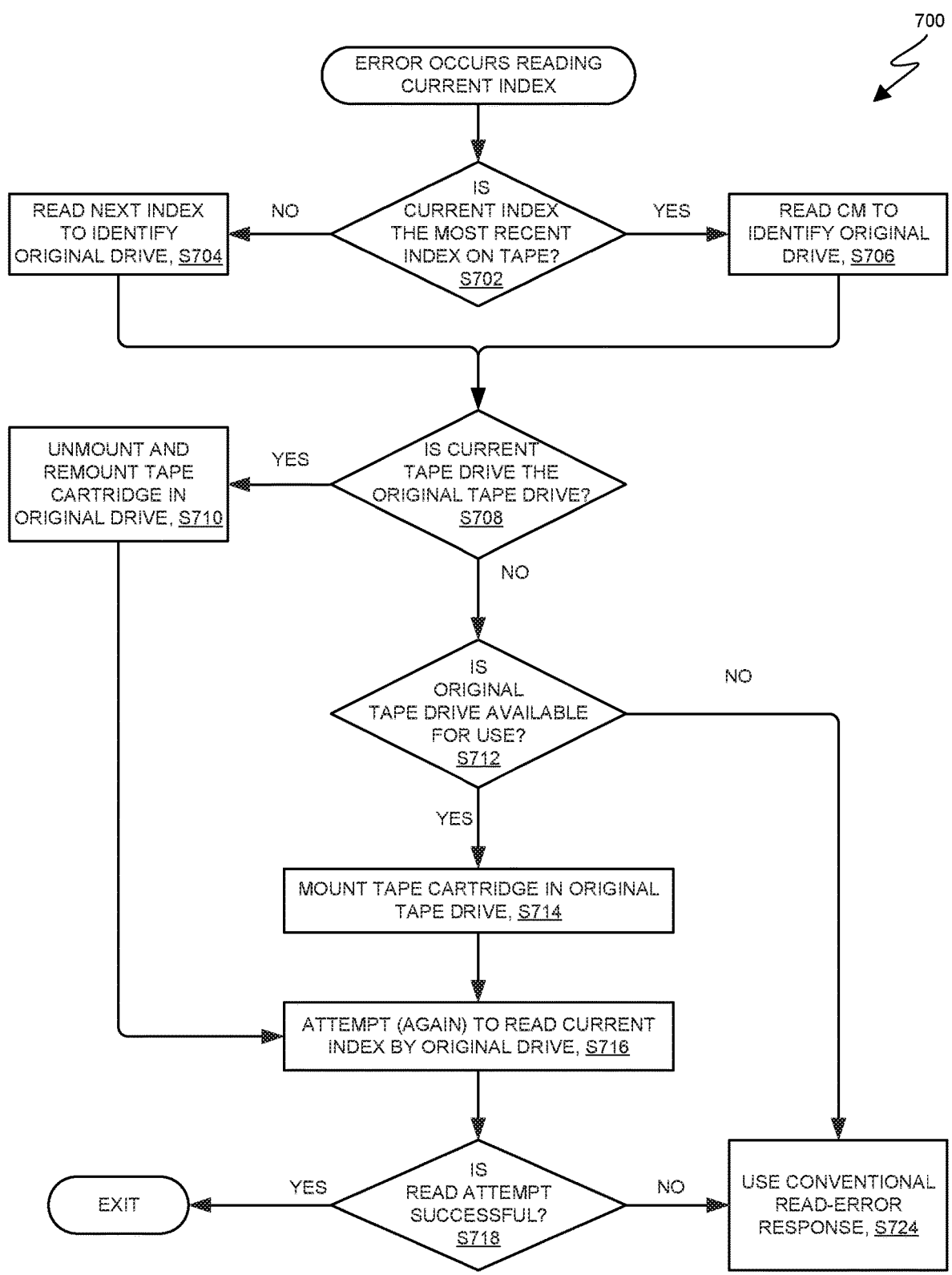
FIG. 7 is a flowchart showing a method performed, at least in part, in accordance with at least one embodiment of the present invention.

Index error flowchart 700 of FIG. 7 shows a method in accordance with some embodiments of the present invention for responding to a read error resulting from an attempt to read a current index from a current tape cartridge that is mounted in a current tape drive. Terms as used in this discussion with respect to index error flowchart 700 are defined as follows: (i) "current index" refers to any index on the tape which the tape drive attempts to read and results in a read error; (ii) "next index" means an index that had been written, on the tape, more recently than the current index; (iii) "current tape cartridge" refers to the tape cartridge (and tape medium therein) on which the current index resides; (iv) "other tape cartridge" or "another tape cartridge" refers to any tape cartridge other than the current tape cartridge; (v) "current tape drive" refers to the tape drive that the current tape cartridge is mounted in when the index read error is encountered; and (vi) "original tape drive" refers to the drive (which is one of (potentially) many drives having written data to the tape) that had written the current index. Further with respect to item (ii) above, the term "next index" refers to any index written after the current index had been written, including an index written immediately after the current index with no other index writes in between.

Processing begins at decision S702 where, after having encountered an error attempting to read the current index, a tape drive controller determines if the current index is the most recently written index on the tape. If the current index is not the most recently written index on the tape, (decision S702, "No" branch), processing proceeds at operation S704 where the tape drive controller directs the current tape drive to locate the next index and read drive specific information from the located index to identify the original tape drive. In response, the tape drive: (i) proceeds to read the next index; (ii) acquires drive specific information; and (iii) based on the information, identifies the original tape drive. As discussed above with respect to index writing flowchart 500 of FIG. 5, one of skill in the relevant art will recognize that the next index contains information that can be used to identify the original tape drive. More generally, any given index, written in accordance with some embodiments of the present invention, contains information that can be used to identify all tape drives that have performed write operations on the tape, up to the most recent tape drive that had written to the tape at the time the given index had been written.

Returning to decision S702, if the current index is the most recently written index on the tape (decision S702, "Yes" branch), processing proceeds at operation S706, where the tape drive controller reads, from the cartridge memory of the current tape cartridge, information that can be used to identify the original tape drive, and based on the information, determines the identity of the original tape drive. As discussed above with respect to index writing flowchart 500 of FIG. 5, one of skill in the relevant art will recognize that the cartridge memory (in addition to the next index) contains drive specific information that can be used to identify the original tape drive.

Following both operations S704 and S706, processing proceeds at decision S708, where the tape drive controller compares the identities of the original and current tape drives to determine whether the current tape drive is the same unit as the original tape drive. If the current and original tape drives are the same unit (decision S708, "Yes" branch), processing proceeds at operation S710, where tape drive controller un-mounts and re-mounts (back into the current tape drive) the tape cartridge, whereupon processing proceeds to operation S716 where the current tape drive again attempts to read the target data.

Returning to decision S708, if the current and original tape drives are not the same unit (decision S708, "No" branch), processing proceeds at operation S712, where the tape drive controller determines whether the original tape drive is available for use. If the original tape drive is available for use (operation S712, "Yes" branch), the tape drive controller causes the tape to be un-mounted from the current tape drive and mounted in the original tape drive.

Processing proceeds at operation S716, where the original tape drive attempts to read the index current index. If operation S716 follows operation S710, this attempt may be at least a second attempt by the original tape drive to read the current index. If operation S716 follows operation S714, this attempt may be the first attempt by the original tape drive to read the current index.

Processing proceeds at decision S718 where if the attempt to read the current index at operation S716 is successful (decision S718, "Yes" branch), processing proceeds in a conventional manner. If the attempt to read the current index at operation S716 continues to result in a read error (decision S718, "No" branch), processing proceeds at operation S724 where conventional read-error response procedures are carried out.

Some embodiments of the present invention may recognize that in some conventional systems, when an attempt to read target data from a tape causes an error, the tape drive that wrote the target data cannot be identified.

Some embodiments of the present invention may include one, or more, of the following features, characteristics, and/or advantages: (i) in a linear tape file system (LTFS), indexes written to tape, and to cartridge memory, include tape drive specific information; (ii) the tape drive specific information allows an earlier tape drive to be identified once a tape is mounted in a tape drive, even if an error occurs in reading specific data; (iii) tape drive specific information is stored in cartridge memory and/or in at least one index on the tape; (iv) any tape drive that has performed a write operation on the tape can be identified and correlated with respectively corresponding blocks of data written by the drive; and/or (v) tape drive specific information can be obtained from a tape cartridge, either from an index on the tape or from cartridge memory, even if the tape is transferred from one tape library system to another, where both systems operate in accordance with embodiments of the present invention.

Some embodiments of the present invention may include one, or more, of the following features, characteristics, and/or advantages: (i) identifies a tape drive which writes files on a tape; (ii) writes, on the tape, an index including drive specific information about the tape drive which writes the files; (iii) includes in an index: (1) drive specific information about the drive which writes files and is now being used, and/or (2) drive specific information about the drive which wrote a previous index; (iv) uses drive specific information about the drive which has written the latest index, and is now being used, is stored in a cartridge memory; (v) in the event a file read error occurs, identifies the drive which wrote the file based on the drive specific information included in the index; (vi) transfers a tape cartridge to an identified drive to read a data file; (vii) in the event a reading error occurs while attempting to read an index most recently written (the latest index), the original drive, which wrote the latest index, is identified from the drive specific information in cartridge memory, and the cartridge is transferred to the original drive to read the index; (viii) in the event a reading error occurs while attempting to read a previous index (not the latest index), the original drive, which wrote the previous index, is identified based on information recorded in a following index (an index written more recently than the previous index), and reads the previous index using the original drive; and/or (ix) includes a manufacturer ID and a serial ID in the drive specific information.

IV. DEFINITIONS

Extent/data extent: a continuous sequence of recorded blocks; contains file data written as sequential logical blocks.

File/data file: comprises zero or more data extents plus associated metadata stored in an index.

Dataset: a fixed-length (for example, a fixed number of bytes) area of a tape track; a plurality of datasets lie in a sequential series formatted along the length of the tape track; alternatively, any data, for example user data, log files, indexes, etc., which is recorded on, and/or read from, a storage medium.

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

User/subscriber: includes, but is not necessarily limited to, the following: (i) a single individual human; (ii) an artificial intelligence entity with sufficient intelligence to act as a user or subscriber; and/or (iii) a group of related users or subscribers.

Data communication: any sort of data communication scheme now known or to be developed in the future, including wireless communication, wired communication and communication routes that have wireless and wired portions; data communication is not necessarily limited to: (i) direct data communication; (ii) indirect data communication; and/or (iii) data communication where the format, packetization status, medium, encryption status and/or protocol remains constant over the entire course of the data communication.

Receive/provide/send/input/output/report: unless otherwise explicitly specified, these words should not be taken to imply: (i) any particular degree of directness with respect to the relationship between their objects and subjects; and/or (ii) absence of intermediate components, actions and/or things interposed between their objects and subjects.

Without substantial human intervention: a process that occurs automatically (often by operation of machine logic, such as software) with little or no human input; some examples that involve "no substantial human intervention" include: (i) computer is performing complex processing and a human switches the computer to an alternative power supply due to an outage of grid power so that processing continues uninterrupted; (ii) computer is about to perform resource intensive processing, and human confirms that the resource-intensive processing should indeed be undertaken (in this case, the process of confirmation, considered in isolation, is with substantial human intervention, but the resource intensive processing does not include any substantial human intervention, notwithstanding the simple yes-no style confirmation required to be made by a human); and (iii) using machine logic, a computer has made a weighty decision (for example, a decision to ground all airplanes in anticipation of bad weather), but, before implementing the weighty decision the computer must obtain simple yes-no style confirmation from a human source.

Automatically/Autonomously: without any human intervention.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A method comprising:
   receiving, by a storage system and from a first application, an application dataset;
   loading, by the storage system, and into a first drive unit, a storage device comprising a storage medium and a non-volatile memory device;
   writing, by the first drive unit, and at a first location on the storage medium, the application dataset;
   reading, from the first drive unit, a first identity dataset;
   associating the first identity dataset with the application dataset to produce an associated identity dataset;
   writing, by the first drive unit, at a second location on the storage medium, and further in the non-volatile memory device, the associated identity dataset;
   attempting to read, by a second drive unit, and from the storage medium, the application dataset;
   receiving, from the second drive unit, information indicating that the attempt to read the application dataset failed;
   reading, from the storage medium, the associated identity dataset;
   reading, from the second drive unit, a second identity dataset;
   determining, based, at least in part, on a combination of the second identity dataset and the associated identity dataset, that the first drive unit and the second drive unit are the same drive unit;
   un-mounting the storage device from the second drive unit and re-mounting the storage device in the second drive unit; and
   reading, by the second drive unit, the application dataset.

2. The method of claim 1, further comprising:
   attempting to read, by the second drive unit, the application dataset from the storage medium;
   receiving, from the second drive unit, information indicating that the attempt to read the application dataset failed;
   reading, from the storage medium, the associated identity dataset;
   locating the first drive unit based, at least in part, on the associated identity dataset;
   mounting the storage device in the first drive unit; and
   reading, by the first drive unit, the application dataset.

3. The method of claim 1, further comprising:
   attempting to read, the second drive unit, and from the storage medium, the application dataset;
   receiving, from the second drive unit, information indicating that the attempt to read the application dataset failed;
   reading, from the non-volatile memory device, the associated identity dataset;
   locating the first drive unit based, at least in part, on the associated identity dataset;
   mounting the storage device in the first drive unit; and
   reading, by the first drive unit, the application dataset.

4. The method of claim 1, further comprising:
   attempting to read, by the second drive unit, and from the storage medium, the application dataset;
   receiving, from the second drive unit, information indicating that the attempt to read the application dataset failed;
   reading, from the non-volatile memory device, the associated identity dataset;
   reading from the second drive unit, a second identity dataset;
   determining, based, at least in part, on a combination of the second identity dataset and the associated identity dataset, that the first drive unit and the second drive unit are the same drive unit;
   un-mounting the storage device from the second drive unit and re-mounting the storage device in the second drive unit; and
   reading, by the second drive unit, the application dataset.

5. The method of claim 1, wherein:
the storage system is a tape library storage system operating in accordance with at least one specification of a linear tape file system;
the storage device is a tape cartridge;
the storage medium is a tape medium for data storage;
the non-volatile memory device is memory circuit chip affixed to the storage device;
the first identity dataset comprises information sufficient to uniquely identify the first drive unit;
the second identity dataset comprises information sufficient to uniquely identify the second drive unit;
the associated identity dataset is a portion of an extensible markup language (XML) file; and
the application dataset is a subset of an application data superset.

6. A computer program product comprising a computer readable storage medium having stored thereon program instructions programmed to perform:
receiving, by a storage system and from a first application, an application dataset;
loading, by the storage system, and into a first drive unit, a storage device comprising a storage medium and a non-volatile memory device;
writing, by the first drive unit, and at a first location on the storage medium, the application dataset;
reading, from the first drive unit, a first identity dataset;
associating the first identity dataset with the application dataset to produce an associated identity dataset;
writing, by the first drive unit, at a second location on the storage medium, and further in the non-volatile memory device, the associated identity dataset;
attempting to read, by a second drive unit, and from the storage medium, the application dataset;
receiving, from the second drive unit, information indicating that the attempt to read the application dataset failed;
reading, from the storage medium, the associated identity dataset;
reading, from the second drive unit, a second identity dataset;
determining, based, at least in part, on a combination of the second identity dataset and the associated identity dataset, that the first drive unit and the second drive unit are the same drive unit;
un-mounting the storage device from the second drive unit and re-mounting the storage device in the second drive unit; and
reading, by the second drive unit, the application dataset.

7. The computer program product of claim 6, further comprising:
attempting to read, by the second drive unit, the application dataset from the storage medium;
receiving, from the second drive unit, information indicating that the attempt to read the application dataset failed;
reading, from the storage medium, the associated identity dataset;
locating the first drive unit based, at least in part, on the associated identity dataset;
mounting the storage device in the first drive unit; and
reading, by the first drive unit, the application dataset.

8. The computer program product of claim 6, further comprising:
attempting to read, by the second drive unit, and from the storage medium, the application dataset;
receiving, from the second drive unit, information indicating that the attempt to read the application dataset failed;
reading, from the non-volatile memory device, the associated identity dataset;
locating the first drive unit based, at least in part, on the associated identity dataset;
mounting the storage device in the first drive unit; and
reading, by the first drive unit, the application dataset.

9. The computer program product of claim 6, further comprising:
attempting to read, by the second drive unit, and from the storage medium, the application dataset;
receiving, from the second drive unit, information indicating that the attempt to read the application dataset failed;
reading, from the non-volatile memory device, the associated identity dataset;
reading from the second drive unit, a second identity dataset;
determining, based, at least in part, on a combination of the second identity dataset and the associated identity dataset, that the first drive unit and the second drive unit are the same drive unit;
un-mounting the storage device from the second drive unit and re-mounting the storage device in the second drive unit; and
reading, by the second drive unit, the application dataset.

10. The computer program product of claim 6, wherein:
the storage system is a tape library storage system operating in accordance with at least one specification of a linear tape file system;
the storage device is a tape cartridge;
the storage medium is a tape medium for data storage;
the non-volatile memory device is memory circuit chip affixed to the storage device;
the first identity dataset comprises information sufficient to uniquely identify the first drive unit;
the second identity dataset comprises information sufficient to uniquely identify the second drive unit;
the associated identity dataset is a portion of an extensible markup language (XML) file; and
the application dataset is a subset of an application data superset.

11. A computer system comprising:
a processor set; and
a computer readable storage medium;
wherein the processor set is structured, located, connected and/or programmed to run program instructions stored on the computer readable storage medium; and
the program instructions include instructions to perform:
receiving, by a storage system and from a first application, an application dataset;
loading, by the storage system, and into a first drive unit, a storage device comprising a storage medium and a non-volatile memory device;
writing, by the first drive unit, and at a first location on the storage medium, the application dataset;
reading, from the first drive unit, a first identity dataset;
associating the first identity dataset with the application dataset to produce an associated identity dataset;
writing, by the first drive unit, at a second location on the storage medium, and further in the non-volatile memory device, the associated identity dataset;
attempting to read, by a second drive unit, and from the storage medium, the application dataset;

receiving, from the second drive unit, information indicating that the attempt to read the application dataset failed;

reading, from the storage medium, the associated identity dataset;

reading, from the second drive unit, a second identity dataset;

determining, based, at least in part, on a combination of the second identity dataset and the associated identity dataset, that the first drive unit and the second drive unit are the same drive unit;

un-mounting the storage device from the second drive unit and re-mounting the storage device in the second drive unit; and reading, by the second drive unit, the application dataset.

12. The computer system of claim 11, further comprising:

attempting to read, by the second drive unit, the application dataset from the storage medium;

receiving, from the second drive unit, information indicating that the attempt to read the application dataset failed;

reading, from the storage medium, the associated identity dataset;

locating the first drive unit based, at least in part, on the associated identity dataset;

mounting the storage device in the first drive unit; and reading, by the first drive unit, the application dataset.

13. The computer system of claim 11, further comprising:

attempting to read, by the second drive unit, and from the storage medium, the application dataset;

receiving, from the second drive unit, information indicating that the attempt to read the application dataset failed;

reading, from the non-volatile memory device, the associated identity dataset;

locating the first drive unit based, at least in part, on the associated identity dataset;

mounting the storage device in the first drive unit; and reading, by the first drive unit, the application dataset.

14. The computer system of claim 11, further comprising:

attempting to read, by the second, drive unit, and from the storage medium, the application dataset;

receiving, from the second drive unit, information indicating that the attempt to read the application dataset failed;

reading, from the non-volatile memory device, the associated identity dataset;

reading from the second drive unit, a second identity dataset;

determining, based, at least in part, on a combination of the second identity dataset and the associated identity dataset, that the first drive unit and the second drive unit are the same drive unit;

un-mounting the storage device from the second drive unit and re-mounting the storage device in the second drive unit; and reading, by the second drive unit, the application dataset.

15. The computer system of claim 11, wherein:

the storage system is a tape library storage system operating in accordance with at least one specification of a linear tape file system;

the storage device is a tape cartridge;

the storage medium is a tape medium for data storage;

the non-volatile memory device is memory circuit chip affixed to the storage device;

the first identity dataset comprises information sufficient to uniquely identify the first drive unit;

the second identity dataset comprises information sufficient to uniquely identify the second drive unit;

the associated identity dataset is a portion of an extensible markup language (XML) file; and the application dataset is a subset of an application data superset.

* * * * *